(12) United States Patent
Paval

(10) Patent No.: US 7,725,496 B2
(45) Date of Patent: May 25, 2010

(54) SYSTEM AND METHOD FOR IDENTIFYING APPLICATION RESOURCES

(75) Inventor: Eugen Paval, Ronkonkoma, NY (US)

(73) Assignee: Computer Associates Think, Inc., Islandia, NY (US)

( * ) Notice: Subject to any disclaimer, the term of this patent is extended or adjusted under 35 U.S.C. 154(b) by 289 days.

(21) Appl. No.: 11/454,858

(22) Filed: Jun. 19, 2006

(65) Prior Publication Data

US 2007/0011179 A1    Jan. 11, 2007

Related U.S. Application Data

(60) Provisional application No. 60/691,602, filed on Jun. 17, 2005.

(51) Int. Cl.
G06F 7/00 (2006.01)
G06F 17/30 (2006.01)

(52) U.S. Cl. ............................. 707/802; 707/791
(58) Field of Classification Search ................. 707/102, 707/103 R
See application file for complete search history.

(56) References Cited

U.S. PATENT DOCUMENTS

| | | | | |
|---|---|---|---|---|
| 5,717,925 A * | 2/1998 | Harper et al. | ............... | 707/102 |
| 5,765,154 A * | 6/1998 | Horikiri et al. | ................ | 707/10 |
| 5,878,219 A * | 3/1999 | Vance et al. | ................ | 709/217 |
| 6,028,602 A * | 2/2000 | Weidenfeller et al. | ........ | 715/781 |
| 6,173,279 B1 * | 1/2001 | Levin et al. | .................... | 707/5 |
| 6,256,678 B1 * | 7/2001 | Traughber et al. | .......... | 719/310 |
| 6,567,818 B1 * | 5/2003 | Frey et al. | ................ | 707/103 R |
| 6,868,525 B1 * | 3/2005 | Szabo | ........................ | 715/738 |
| 6,895,430 B1 * | 5/2005 | Schneider | ................... | 709/217 |
| 6,941,292 B2 * | 9/2005 | Gaur et al. | ...................... | 707/2 |
| 7,032,186 B1 * | 4/2006 | Gasser et al. | ............... | 715/853 |
| 7,181,438 B1 * | 2/2007 | Szabo | ........................... | 707/2 |
| 7,246,351 B2 * | 7/2007 | Bloch et al. | ................. | 717/175 |
| 7,281,002 B2 * | 10/2007 | Farrell | ........................ | 707/3 |
| 7,343,597 B1 * | 3/2008 | Smith | ......................... | 717/151 |
| 7,530,020 B2 * | 5/2009 | Szabo | ........................ | 715/738 |

(Continued)

OTHER PUBLICATIONS

Ensel, C. and Keller, A. 2002. An Approach for Managing Service Dependencies with XML and the Resource Description Framework. J. Netw. Syst. Manage. 10, 2 (Jun. 2002), 147-170. Plenum Press, New York, NY, USA.*

(Continued)

*Primary Examiner*—Robert Stevens
(74) *Attorney, Agent, or Firm*—Pillsbury Winthrop Shaw Pittman LLP

(57) ABSTRACT

A system and method for simplifying resource management is provided. Resources are represented by resource objects in a resource object model. Each resource object represents a single resource and contains one or more resource attributes to describe the resource. At least one of the resource attributes for each resource object is a string identifier formed within the constraints of a query grammar. The string identifier is a text-based identifier that is based upon a unique property of the represented resource. A characteristic of the resources is selected as the basis for the relationship between resource objects in the resource object model. In one embodiment, an application identifies resources by generating a search query using the same query grammar used to create the string identifier. In another embodiment, a user manually enters the search query into a command line interpreter.

30 Claims, 2 Drawing Sheets

U.S. PATENT DOCUMENTS

| | | | |
|---|---|---|---|
| 2002/0129129 A1* | 9/2002 | Bloch et al. | 709/220 |
| 2003/0214525 A1* | 11/2003 | Esfahany | 345/700 |
| 2003/0229623 A1* | 12/2003 | Chang et al. | 707/3 |
| 2004/0117386 A1* | 6/2004 | Lavender et al. | 707/100 |
| 2004/0267749 A1 | 12/2004 | Bhat et al. | 707/9 |
| 2005/0086343 A1 | 4/2005 | Chellis et al. | 709/226 |
| 2005/0108001 A1* | 5/2005 | Aarskog | 704/10 |
| 2005/0165766 A1* | 7/2005 | Szabo | 707/3 |
| 2005/0273475 A1* | 12/2005 | Herzenberg et al. | 707/200 |
| 2006/0036579 A1* | 2/2006 | Byrd et al. | 707/3 |
| 2006/0041661 A1* | 2/2006 | Erikson et al. | 709/225 |
| 2006/0059118 A1* | 3/2006 | Byrd et al. | 707/3 |
| 2006/0195420 A1* | 8/2006 | Kilroy | 707/3 |
| 2006/0288023 A1* | 12/2006 | Szabo | 707/100 |
| 2007/0005636 A1* | 1/2007 | Rowley | 707/102 |
| 2007/0156677 A1* | 7/2007 | Szabo | 707/5 |
| 2007/0294289 A1* | 12/2007 | Farrell | 707/103 R |

OTHER PUBLICATIONS

Sudarsan, Rajesh, et al., "Meta-Model Search: Using XPATH to Search Domain-Specific Models", Master of Science Thesis, Univ. of Alabama, Birmingham, © 2004, pp. 1-58.*

Gabillon, Alban, et al., "An Access Control Model for Tree Data Structures", ISC 2002, LNCS 2433, Springer-Verlag, Berlin, Germany, © 2002, pp. 117-135.*

Klie, Torsten, et al., "Integrating SNMP Agents with XML-Based Management Systems", IEEE Communications Magazine, vol. 42, Issue 7, Jul. 2004, pp. 76-83.*

Gavalas, Damianos, et al., "A Hybrid Centralised—Distributed Network Management Architecture", Proc. of the IEEE International Symposium on Computers and Communications, Jul. 6-8, 1999, pp. 434-441.*

Microsoft Computer Dictionary, 5th Edition, Microsoft Press, Redmond, Wa, © 2002, pp. 215, 246 and 489.*

Menten, Lawrence E., "Experiences in the Application of XML for Device Management", IEEE Communications Magazine, vol. 42, Issue 7, Jul. 2004, pp. 92-100.*

Ju, Hong-taek, et al., "An Embedded Web Server Architecture for XML-Based Network Management", NOMS 2002, © 2002, pp. 1-14.*

Edwards, W. Keith, "Policies and Roles in Collaborative Applications", CSCW '96, Cambridge, MA, © 1996, pp. 11-20.*

Jiang, Changhao, et al., "A Hybrid Location Model with a Computable Location Identifier for Ubiquitous Computing", UbiComp 2002, LNCS 2498, Springer-Verlag, Berlin, Germany, © 2002, pp. 246-263.*

* cited by examiner

SYSTEM AND METHOD FOR IDENTIFYING APPLICATION RESOURCES

CROSS REFERENCE TO RELATED APPLICATIONS

This application claims the benefit of provisional U.S. Patent Application Ser. No. 60/691,602, entitled "System and Method for Identifying Application Resources," filed Jun. 17, 2005, and which is hereby incorporated by reference in its entirety.

FIELD OF THE INVENTION

The invention relates generally to resource management, and in particular, to providing a uniform method of naming resources. The invention is particularly well-suited for software management applications, enterprises where applications interact with a large number of resources, or where third parties or human operators must specifically identify resources.

BACKGROUND OF THE INVENTION

Currently, there is no well defined, formalized and standardized process for naming the resources with which a system or application interacts. Instead, each application usually chooses its own method of naming resources. Moreover, naming resources and finding resources are considered still two different processes. Sometimes an application will use the name of a resource as a key to search for the resource against a pre-built resource index. This method works for that application only because other applications may not be aware of naming techniques used by other applications and there is no formal relationship between the key and the resource in question.

Another problem with resource naming is the difficulty for human operators to identify and locate resources. Some environments may assist an operator through a graphical user interface (GUI), which may hide the complexity of unique identification. However, this is not possible in environments that implement a command line interface (CLI), in which a user has to key in a resource name manually. Since applications often ensure uniqueness in resource naming by following algorithms based on statistics and random number generators, a resource key is often completely unrelated to the characteristics of the resource and impossible for a human operator to memorize or reconstruct based on resource characteristics.

Therefore, there is a need for a method of naming resources that makes resources easily identifiable across applications at runtime. In addition, there is a need for a method of naming resources which allows a human user and/or operator to identify and locate resources based on predictable characteristics.

SUMMARY OF THE INVENTION

The invention solves the aforementioned problems by providing a system and method that simplifies resource management. According to the invention, this system and method provides a uniform naming mechanism. In some embodiments, a method for managing resources includes building a resource object model, wherein the resource object model includes one or more resource objects. Each resource object represents a single resource, wherein the resource object may be characterized by one or more resource attributes. The particular attributes may depend on the type and/or characteristics of the particular resource. In some embodiments, the set of attributes may include at least a string identifier formed within the constraints of a query grammar. A naming module creates the string identifier based on a unique property of the represented resource. A characteristic of the resources may be selected as the basis for the relationship between resource objects. For example, the chosen characteristic may be a containment relationship.

In some embodiments, the resource object model may take the form of a hierarchical search tree, in which the resource objects are nodes in the search tree, and where the resource characteristic forming the basis for the relationship between research objects guides the placement of nodes in the search tree. Each system or application resource may be identified and represented by at least one resource object in the search tree, with the string identifiers being formed within the constraints of the XPath query grammar. In some embodiments, after the search tree is built, it may be assimilated into an XML document. Resource formats other than XML and query grammars other than XPath may be used without departing from the scope and spirit of the invention. Those skilled in the art will recognize that resources may be identified and represented using different techniques without departing from the scope and spirit of the invention. Whatever format and/or query grammar is chosen, criteria may be expressed in a well defined and formalized query language with a known grammar which enables both the programmatic creation of the name as well as the parsing of the name.

In some embodiments, resources may be located or identified within the search tree by resolving one or more search queries against the search tree. In one embodiment, the search query may be generated at run-time by an application that requires a resource. In other embodiments, the search query may be an input to a user interface, such as a command line interpreter. The search query may take the form of a string formed within the constraints of the same query grammar used to form string identifiers of resource objects in the resource object model. Executing the query includes parsing the resource object model and identifying resources that satisfy the search query. For example, the query string may be compared to the string identifiers used to describe resource objects. Those skilled in the art will recognize that other techniques for solving search queries may be used without departing from the scope and spirit of the invention.

In other embodiments, a system including one or more processing devices may be collectively configured to practice the aforementioned method. In other embodiments, a computer-readable medium includes computer-executable instructions for practicing the aforementioned method. Other objects and advantages of the invention will be apparent to those skilled in the art based on the following detailed description and accompanying drawings.

DETAILED DESCRIPTION

The invention provides a system and method of naming resources that is both predictable and memorable, thereby allowing applications to easily locate required resources at run-time, while also enabling a user to locate and identify resources by keying a resource name into a user interface.

Figure 1:
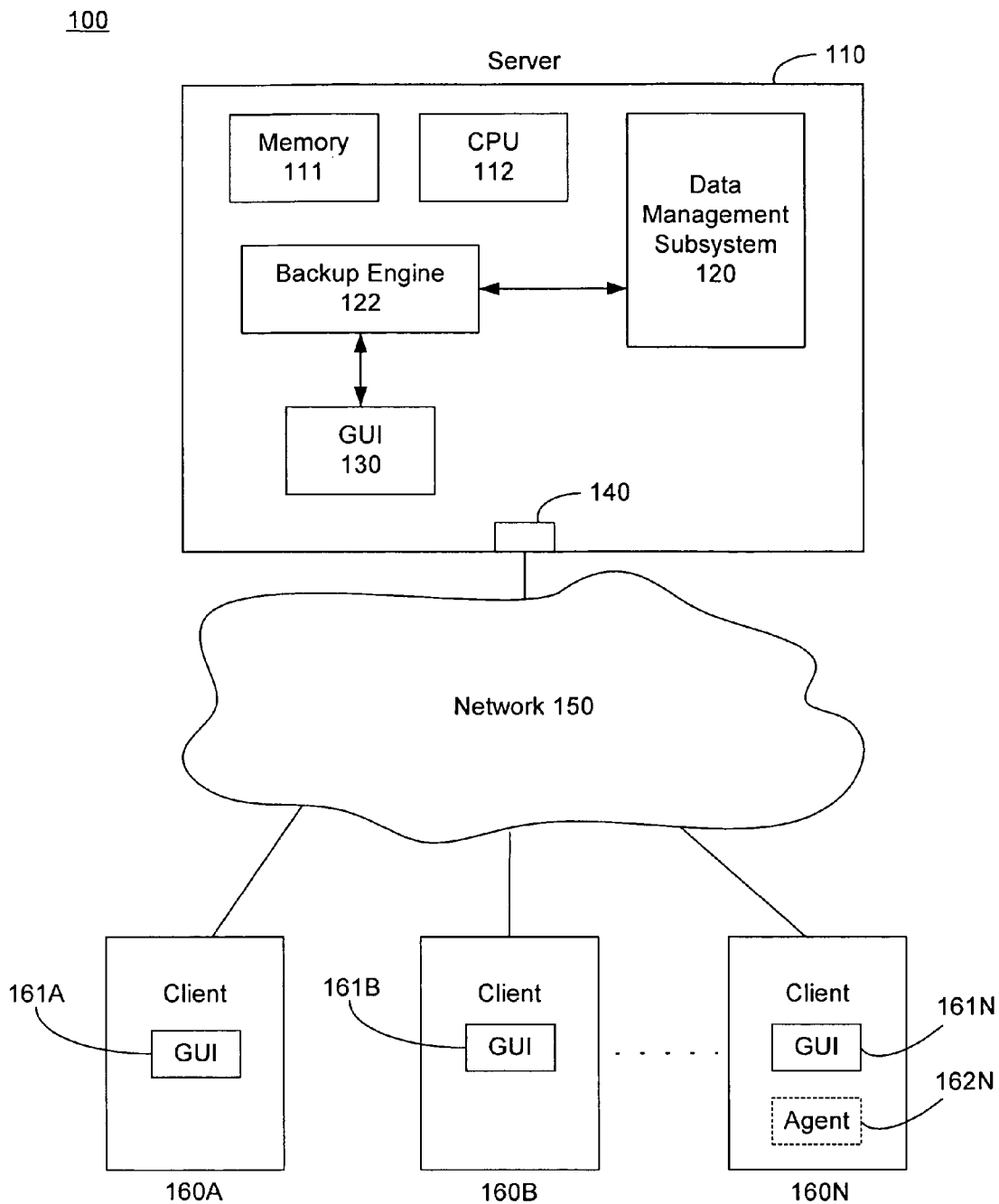
FIG. 1 is a block diagram of an exemplary architecture for practicing the invention.

The invention may be practiced in any number of computer systems and/or architectures, and simplifies resource management even for enterprises that may interact with vast numbers of files and/or application instances. Referring to FIG. 1, an exemplary system for practicing the invention is described. According to some embodiments, system 100 may include a server 110 and one or more clients 160a-n that are interconnected by one or more networks 150. Server 110 includes memory 111, at least one processor 112, and a data management subsystem 120 operable to receive, transmit, process, store, or otherwise manage data associated with system 100. While FIG. 1 describes a particular architecture in which the invention may be practiced, those skilled in the art will appreciate that other suitable computing architectures may be used. For example, server 110 may be implemented as a blade server, general-purpose personal computer (PC), Macintosh, workstation, Unix-based computer, server pool, or any other suitable device. In other words, the invention contemplates networked environments, general purpose computers, as well as computers without conventional operating systems. Server 110 may be adapted to execute any operating system including Linux, UNIX, Windows Server, or others. According to various embodiments, server 110 may also include or be communicatively coupled with a web server and/or a mail server.

Memory 111 may include any memory or database module and may take the form of volatile or non-volatile computer-readable media including, without limitation, magnetic media, optical media, random access memory (RAM), read-only memory (ROM), removable media, or any other suitable local or remote memory component. For example, memory 111 may store backup data, jobs, or disk recovery information that may include any parameters, variables, algorithms, instructions, rules or other data from clients 160a-n. Memory 111 may also include any other appropriate data such as virtual private network (VPN) applications, firmware logs and policies, firewall policies, a security or access log, print or other reporting files, HTML files or templates, and others.

Processor 112 executes instructions and manipulates data to perform the operations of server 110, and may take the form of a central processing unit (CPU)) a blade, an application specific integrated circuit (ASIC), field-programmable gate arrays (FPGA), or other processing architectures that are known to those skilled in the art. Although described as a single processor in server 110, multiple processors may be used according to the particular needs where applicable. In various embodiments, processor 112 may execute a backup engine 122, which may be software operable to perform backup, storage, or other operations to manage data as needed. In some embodiments, backup engine 122 interacts with data management subsystem 120 to perform various data management services. As used herein, "software" includes any suitable combination of software, logic, or other computer-executable instructions that can be executed over hardware, as appropriate. For example, backup engine 122 may be written or described in any appropriate computer language, and the backup engine may be a single multi-tasked module or the features may be performed by multiple modules. Further, while described as internal to the server, one or more processes associated with backup engine 122 may be stored, referenced, or executed remotely. Similarly, one or more devices associated with data management subsystem 120 may be alternatively be located within server 110 or remotely, as appropriate. Additionally, backup engine 122 may be a child or sub-module of another software module without departing from the scope of the invention. In some embodiments, backup engine 122 may be communicatively coupled with a graphical user interface (GUI) 130. In other embodiments, GUI 130 may be included, within backup engine 122 or an administrative workstation coupled to server 110.

Server 110 may also include a network interface 140 for communicating with other computer systems, such as clients 160a-n, over network 150 in a client-server or distributed environment. Generally, network interface 140 includes logic encoded in software and/or hardware in a suitable combination and may be operable to communicate with network 150. More specifically, network interface 140 may include software supporting one or more communication protocols associated with communications network 150 and/or hardware operable to communicate electrical signals.

Network 150 facilitates wireless or wired communication between server 110 and any other local or remote computers, such as clients 160a-n. Network 150 may be all or part of an enterprise or secured network. In another embodiment, network 150 be a VPN between server 110 and clients 160a-n across a wireless or wired link. While described as a single network, network 150 may be logically divided into sub-nets or virtual networks without departing from the scope of the invention. Network 150 may communicate using any known network protocol, including Internet Protocol (IP), Frame Relay, Asynchronous Transfer Mode (ATM), as well as many others. Network 150 may include one or more local area networks (LANs), radio access networks (RANs), metropolitan area networks (MANs), wide area networks (WANs), or all or a portion of the Internet. In certain embodiments, network 150 may be a secure network associated with an enterprise and certain local or remote clients. In other embodiments, server 110 may be communicatively coupled with one or more remote resources over network 150 (in addition to local resources). These resources may be intra-enterprise, inter-enterprise, regional, or national applications, data sources, or repositories associated with the enterprise. Resources may be physically or logically located at any appropriate location.

Clients 160a-n may be any computing device operable to connect or communicate with server 110 or network 150 using a wireless or wired connection. Each client 160a-n includes at least a GUI 161. In other embodiments, clients 160a-n may include an agent 162, and includes an electronic computing device operable to receive, transmit, process, and store any appropriate data associated with the system 100. It will be understood that there may be any number of clients 160a-n communicatively coupled to server 110 via network 150. For example, clients 160a-b may be local clients within the enterprise, or alternatively may be external to the enterprise. Clients 160a-n may include any permutation of personal computers, touch screen terminals, workstations, network computers, kiosks, wireless data ports, smart phones, personal data assistants (PDAs), or any other suitable processing device. For example, client 160a may be a laptop or personal computer that includes an input device, such as a keypad, touch screen, mouse, or other input device, and an output device that conveys information associated with the operation of server 110 or client 160a, including digital data, analog data, or visual information. Both the input device and output device may include fixed or removable storage media such as magnetic computer disks, CD-ROMs, or other suitable media to both receive input from and provide output to users of clients 160a-n through the display, i.e., GUI 161a-n.

GUI 161a-n may include a graphical user interface operable to allow a user, administrator, or other authorized user to interface with at least a portion of system 100 for any suitable purpose. Generally, GUI 161a-n provide the particular user with an efficient and user-friendly presentation of data provided by or communicated within system 100. GUI 161a-n may include a plurality of customizable frames or views having interactive fields, pull-down lists, and buttons operated by the user. GUI 161a-n may be configured to support a combination of tables and graphs (bar, line, pie, status dials, etc.), and may build real-time dashboards, where tabs are delineated by key characteristics (e.g., site). GUI 161a-n may also generate or request historical reports. Generally, historical reports provide critical information on what has happened including static or canned reports that require no input from the user and dynamic reports that quickly gather run-time information to generate the report. Therefore, GUI 161a-n contemplates any graphical user interface, such as a generic web browser, touch screen, or CLI that processes information in system 100 and efficiently presents the results to the user. Server 110 can accept data from clients 160a-n via the web browser (e.g., Microsoft Internet Explorer, Netscape Navigator, or Mozilla Firefox) and return the appropriate HTML or XML responses using network 150. Clients 160a-n also occasionally include, reference, or execute agents, which may be any script, library, object, executable, service, daemon, or other process. Those skilled in the art will appreciate that the system described in FIG. 1 is exemplary only, and that many other architectures are supported and can make use of the invention.

The invention contemplates that the resources in the system of FIG. 1 may be represented by a hierarchical object model in which resources are nodes in a search tree. The term "resource" includes both physical and virtual resources. Physical resources may be the devices and other physical structures connected to a computer system, including but not limited to disks, processors, memories, servers, etc. Virtual resources may include logical resources, including but not limited to files, network connections, memory areas, domains, etc. For example, the system of FIG. 1 is generally described as a client-server network architecture. In an embodiment where system 100 is configured to provide backup services, routing and organizing data would require identification of the logical domains making up the network, as well as the physical host devices where data is persistently stored. Additionally, the backup services may interact with a large number of files and/or applications to produce numerous archives. A backup task may thus need to uniquely identify servers, folders, files, storage groups, and user mailboxes. Those skilled in the art will recognize that providing backup services is just one of many tasks that system 100 may perform and that the specific resources may vary depending on the particular application. Moreover, other tasks or applications may interact with the same resources required by another application, such that the resources required for any one task may be named in a uniform way so as to make the resource easily identifiable to other applications as well as human operators.

Figure 2:
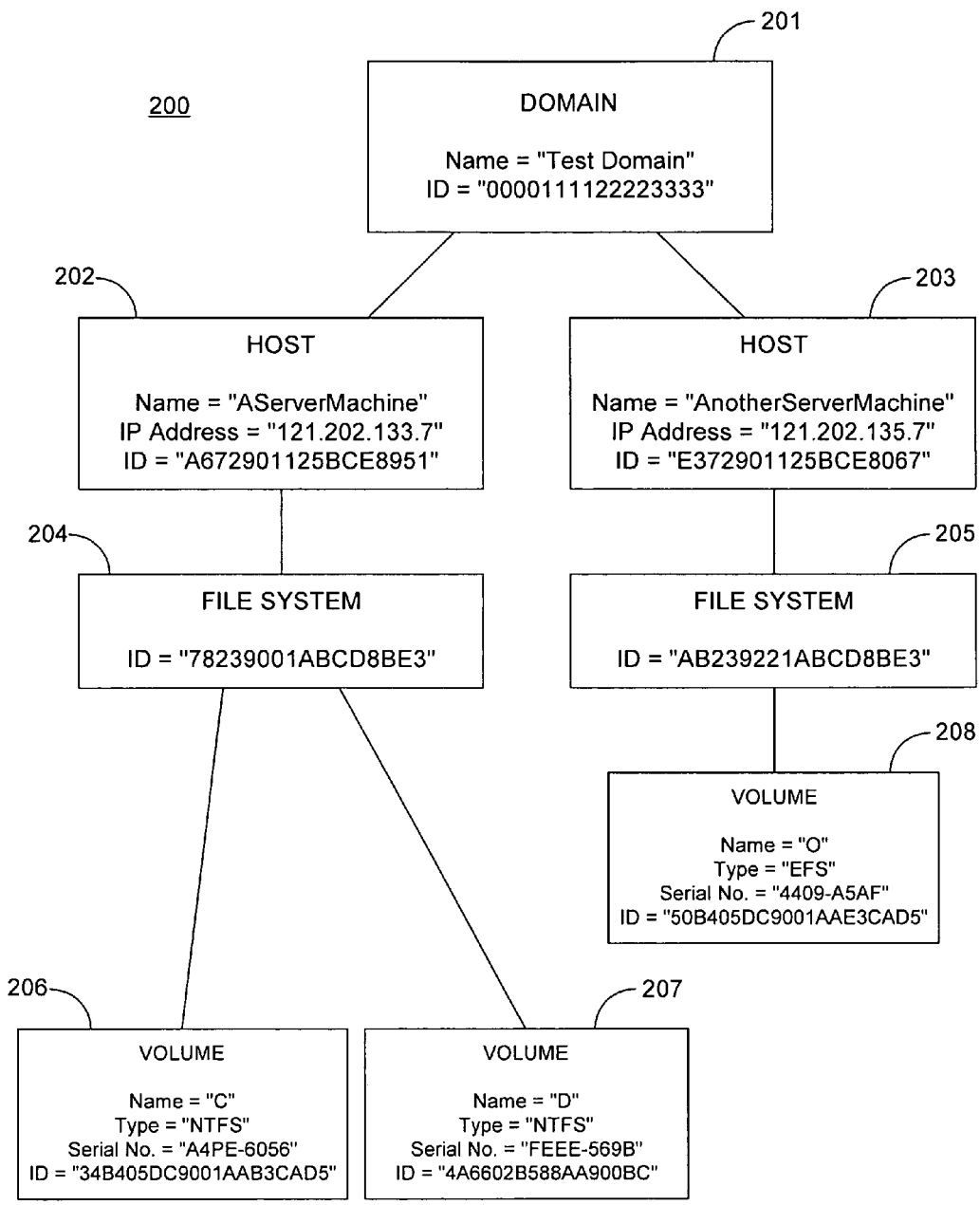
FIG. 2 is a logical diagram of an exemplary object model for organizing resources according to the invention.

Referring to FIG. 2, a logical diagram of an exemplary hierarchical object model 200 for describing resources is provided. When a resource is registered with a conventional system, a typical approach is for the resource to be assigned a unique identifier based on a statistical model or a random number generator. Thus, domain resource object 201 may be assigned a unique hexadecimal ID "0000111122223333," host resource object 202 may be assigned a unique ID "A672901125BCE8951," host resource object 203 may be assigned a unique ID "E372901125BCE8967," and so on for every resource in the system. However, this unique ID would only be known to the application that registers the resource, such that other applications requiring the resource are unable to locate the resource based on the unique key and would therefore be obligated to redundantly register the resource. In addition, the key bears no relation to the resource in question and therefore would be very difficult or impossible for a human operator to recreate easily, especially in a CLI environment.

The invention solves the aforementioned problem by providing each resource with a memorable set of attributes, such that each resource object includes enough information to uniquely and unequivocally distinguish a resource. In order to provide each resource object with a memorable identifier, a text-based set of properties and/or attributes are created to identify the resource on the system, where the particular attributes may be dictated by the nature of the resource. For example, a domain may be best defined by its name, such that a domain object 201 includes a name attribute identifying its name as "TestDomain." Similarly, a server or host typically is assigned a unique name and IP address identifying its location on the network. Thus, host objects 202 and 203 may have name attributes "AServerMachine" and "AnotherServerMachine," respectively, in addition to IP address attributes "121.202.133.7" and "121.202.135.17," respectively.

A host may provide a number of services, such as a data management service that uses a file system. File systems are well known to those skilled in the art and are most often characterized by the manner in which data is organized on a storage device. Thus, FileSystem resource objects 204 and 205 do not require any additional identifying attributes, since they simply point to the storage volumes where data is stored. Nonetheless, FileSystem resource objects 204 and 205 may still be provided with a unique random-number ID. To uniquely identify a storage volume, the relevant properties may include a name of the volume, a data format used for organizing data, as well as a serial number of the device. Thus, in FIG. 2, volume object 206 may be described by a name attribute "c," a file system type "NTFS," and a serial number "A4FE-0056." Volume objects 207 and 208 are similarly described by attributes that denote the characteristics of the particular volume.

In addition to providing memorable text-based attributes, the invention may organize resource objects 201-208 according to a structure that may be easy to follow and memorize. A relationship between resources 201-208 may be chosen to define the basis for organizing resource objects 201-208 in the resource object model 200. While the invention is not limited to any particular relationship, object model 200 may be implemented using a containment relationship since it is generic enough to accommodate other relationships as well as modeling the layout of most real-world systems. For example, still referring to FIG. 2, a domain 201 contains one or more hosts 202-203, each of which contain one or more services, such as a file system 204-205, each of which contain one or more storage volumes 206-208. The concept of containers and containment is known to those skilled in the art.

Those skilled in the art will recognize that there are many possible variants of resource objects 201-208 and object model 200 described above. For example, a storage volume 206-208 may be formatted to store data using other file system types, including but not limited to FAT, EFS, HFS, NFS, and UDF, among others. Another possible variant is a logical partition on a storage volume 206-208, such that multiple volume objects may share a common serial number attribute and file format attribute, while having distinct name attributes. Moreover, hosts may provide additional services, such as an e-mail service that goes through an exchange. E-mail services are well known to those skilled in the art, and may include storage group objects, database objects, and user mailbox objects. There may be multiple domains, hosts, or other objects as needed to describe the resources in a system. The previous description of FIG. 1 indicates in greater detail the potential variance in system and application resources. Thus, those skilled in the art will appreciate that when designing a resource object model analogous to that described in FIG. 2, which attributes are included to describe a resource may consider the nature of the system and resources being represented.

A resource format may be chosen which allows representing the attributes and relationship between resource objects. The resource format may express criteria using a well defined, formalized query language. In addition, the query language may be compatible with a known query grammar in order allow the programmatic creation and parsing of the resource object model. Referring to Table 1, exemplary source code is provided for implementing the object model of FIG. 2 using eXtensible Markup Language (XML).

TABLE 1

```
<?xml version="1.0" encoding="utf-8" ?>
<as:ResourceSchema version='1.0'
             xmlns:as="http://www.example.com/ResourceSchema">
    <as:Domain strongID="0000111122223333"
             name="TestDomain">
        <as:Host strongID="A6772901125BCE8951"
                name="AServerMachine"
                ipAddress="121.202.133.7">
            <as:FileSystem strongID="78239001ABCD8BE3">
                <as:Volume strongID="34B405DC9001AAE3CAB5"
                        type="NTFS"
                        name="c"
                        serialNo="A4FE-0056"/>
                <as:Volume strongID="4A6602B588AA900BC"
                        type="NTFS"
                        name=d"
                        serialNo="FEEE-569B"/>
            </as:FileSystem>
        </as:Host>
        <as:Host strongID="E372901125BCE8967"
                name="AnotherServerMachine"
                ipAddress=:121.202.135.17">
            <as:FileSystem strongID=AB239221ABCD8BE3">
                <as:Volume strongID="50B405DC9001AAE3CAB5"
                        type="EFS"
                        name="0"
                        serialNo="4409-A5AF"/>
            </as:FileSystem>
        </as:Host>
    </as:Domain>
</as:ResourceSchema>
```

The resource object model may be represented by XML in the embodiment of Table 1 because it is inherently organized in a tree structure and XML provides the capability of creating special-purpose markup descriptions for describing data. XML also enables similar functionality to that of a relational database, in addition to being easily parsed and searched using well known query grammars, such as XPath. Those skilled in the art will recognize that although the resource tree is shown as being implemented using XML and queried using XPath, other formats, languages, or query grammars may be used to create or search the resource object model without departing from the inventive concepts described herein.

Referring to Table 2, exemplary source code is provided for defining a schema for unique resource naming.

TABLE 2

```
<?xml version="1.0" encoding "utf-8" ?>
<xs:schema targetNamespace="http://www.example.com/
```

TABLE 2-continued

```
ResourceSchema"
    xmlns="http://www.example.com/ResourceSchema"
    xmlns:xs="http://www.w3.org/2001/XMLSchema">
    <xs:element      name="resource" type="ResourceType"/>
    <xs:complexType  name="ResourceType">
      <xs:attribute   name="urn"
                      type="xs:string"
                      use="optional"/>
      <xs:sequence   maxOccurs="1">
        <xs:element type="ResourceType"
                      minOccurs="1"
                      maxOccurs="unbounded"/>
      </xs:sequence>
    </xs:complexType>
</xs:schema>
```

The source code of Table 2 is provided in XML in order to demonstrate how the resource search tree of Table 1 may incorporate a string identifier resource attribute. To assimilate the string identifier resource attribute into the resource object model in a way that allows querying the object model using known query grammars, the string identifier may be formed within the constraints of a query grammar. Thus, using the resource schema of Table 2, a resource name would be expected to take the following form:

<resource URN="STRING FORMED WITHIN CONSTRAINTS OF A QUERY GRAMMAR"/>

In the embodiment described, XPath may be chosen as the query grammar based on its compatibility with XML. However, those skilled in the art will recognize that other query grammars may be used. The resource string identifier may be unique to a single resource, and a single resource may be described by multiple string identifiers. For example, referring to FIG. 2 and Table 1, consider the volume object 206 in FIG. 2, which possesses name attribute "c," serial number attribute "A4FE-0056" located on the host machine with name attribute "AServerMachine" with an IP address attribute of "121.202.133.7." Creating the string identifier attribute may consider the characteristics of the resource and guarantee uniqueness by accounting for the set of most significant resource attributes. For example, using the resource schema of Table 2 and using XPath as the query grammar, a valid resource name for volume object 206 may be:

<resource URN="//Volume[@name='c']"/>

However, this resource name may be unlikely to guarantee uniqueness since a volume object on another host may share the same volume name. Instead, including additional characteristics, such as the name or IP address of the host on which the volume resides, may be more likely to produce a resource name that unequivocally identifies the volume. For example, the following resource names formed according to the resource schema of Table 2 would uniquely identify volume object 206 of FIG. 2:

<resource URN="//Domain[@name='TestDomain']/Host[@name='AServerMachine']/FileSystem/ Volume[@name='c']"/>

<resource URN="//Host[@ipAddress=121.202.133.7']/FileSystem/ Volume[@serialNo='A4FE-0056']"/>

<resource URN="//Host[@ipAddress=121.202.133.7']/FileSystem/ Volume[@name='c']"/>

Referring to Table 3, exemplary source code is provided for incorporating a resource name into a hierarchical resource object model.

avoiding the pitfalls existing in resource naming. For example, a valid resource name may be:

<resource URN="//Server[@name='MyExchangeServer']/Exchange/Storage-Group[@name='First Storage Group']/Database[@name='Mail']/Mailbox[@user='John Anderson']"/>

This resource name indicates that John Anderson's mailbox is located in the Mail database in the First Storage Group on the MyExchangeServer server. By identifying resources based on their identifiable characteristics, an application or user may generate a search query based on those characteristics. Thus, there is no need to memorize serial numbers, random number strings, or other arcane conventional identifiers. Rather, an application may identify a resource at run-time or a user may identify a resource through a command line interpreter since the resources are organized and named intuitively, while being compatible with a query grammar. For example, consider volume object 206 in FIG. 2 with the following resource name:

<resource URN="//Host[@ipAddress=121.202.133.7']/FileSystem/ Volume[@serialNo='A4FE-0056']"/>

When an application requires access to volume object 206 at run-time, such as to store data, or where a user must interact with volume object 206 through a command line interpreter, such as to reconfigure the device, a search query formed

TABLE 3

```
<?xml version="1.0" encoding="utf-8" ?>
<as:ResourceSchema    version='1.0'
                     xmlns:as="http://www.example.com/ResourceSchema">
    <as:Domain strongID="0000111122223333"
               name="TestDomain">
    <as:Host    strongID="A6772901125BCE8951"
                name="AServerMachine"
                ipAddress="121.202.133.7">
        <as:FileSystem strongID="78239001ABCD8BE3">
            <as:Volume strongID="34B405DC9001AAE3CAB5"
                       type="NTFS"
                       name="c"
                       serialNo="A4FE-0056">
                <resource   URN="//Domain[@name='TestDomain']/Host[@name=
                            'AServerMachine']/FileSystem/Volume[@name='c']"/>
                <resource   URN="//Host[@ipAddress=121.202.133.7']/FileSystem/
                            Volume[@serialNo]'A4FE-0056']"/>
                <resource   URN="//Host[@ipAddress=121.202.133.7']/FileSystem/
                            Volume[@name='c']"/>
            </as:Volume>
            <as:Volume strongID="4A6602B588AA900BC"
                       type="NTFS"
                       name=d"
                       serialNo="FEEE-569B"/>
        </as:FileSystem>
    </as:Host>
    <as:Host strongID="E372901125BCE8967"
             name="AnotherServerMachine"
             ipAddress=:121.202.135.17">
        <as:FileSystem  strongID=AB239221ABCD8BE3">
            <as:Volume strongID="50B405DC9001AAE3CAB5"
                       type="EFS"
                       name="0"
                       serialNo="4409-A5AF"/>
        </as:FileSystem>
    </as:Host>
    </as:Domain>
</as:ResourceSchema>
```

The techniques described above may similarly be used to provide a text-based string identifier for any resource, while within the constraints of the XPath query grammar will locate the resource. Such a search query may take the following form:

//Host[@ipAddress='121.202.133.7']/FileSystem/Volume
[@serialNo='A4FE-0056']

The search query may be resolved against the hierarchical search tree by parsing the search tree using techniques known to those skilled in the art. The search tree may be traversed and resource objects that have string identifiers corresponding to the search query are identified. The results of this comparison are then returned to the originator of the search query.

Those skilled in the art will appreciate that the specific query languages and/or grammars chosen are secondary to the inventive concept of choosing an intuitive resource data structure and naming method that allows searching a tree using a query grammar. Those skilled in the art will be aware of many techniques for implementing and generating the search tree and string identifier(s). Moreover, those skilled in the art will be aware of the techniques required to implement the necessary application programming interfaces (APIs) to enable an application to generate a search query at run-time. Similarly, system administrators and other users of ordinary skill who require identifying resources through command line interpreters will possess the necessary technical knowledge for forming an resolving search queries based on the above disclosure.

Although this disclosure has been described in terms of certain embodiments and associated methods, modifications and permutations of these embodiments and methods will be apparent to those skilled in the art. Accordingly, the above description is meant to be exemplary only, and other changes, substitutions, and alterations may be implemented without departing from the scope and spirit of the invention.

What is claimed is:

1. A method for identifying application resources, comprising:
   generating a resource object model that includes a plurality of resource objects organized within a hierarchical search tree according to one or more containment relationships among the plurality of resource objects, wherein each of the plurality of resource objects represents a respective resource having a unique set of attributes, and wherein the hierarchical search tree can be parsed and searched using a predetermined query grammar;
   creating a plurality of unique resource identifiers that provide respective names for each of the plurality of resource objects in the resource object model, wherein the respective names that the plurality of unique resource identifiers provide for the plurality of resource objects each include a text-based string that expresses the unique set of attributes for the respectively represented resource within constraints of the predetermined query grammar;
   searching the hierarchical search tree in response to a request for at least one of the resources represented in the resource object model, wherein the request includes a search query having a text-based string that expresses the unique set of attributes for the requested resource within the constraints of the predetermined query grammar; and
   returning, to an application that requested the resource, the unique resource identifier that provides the name for one of the plurality of resource objects that represents the requested resource, wherein the unique resource identifier includes the text-based string that expresses the unique set of attributes for the requested resource, and wherein the application uses the unique resource identifier returned to the application to interact with the requested resource.

2. The method of claim 1, wherein one or more of the plurality of resource objects in the resource object model represent application resources associated with the application.

3. The method of claim 1, wherein one or more of the plurality of resource objects in the resource object model represent system resources associated with the application.

4. The method of claim 1, wherein each of the plurality of unique resource identifiers are created according to a schema for uniquely naming the resources represented in the resource object model within the constraints of the predetermined query grammar.

5. The method of claim 1, wherein searching the hierarchical search tree in response to the request includes:
   parsing the resource object model according to the one or more containment relationships among the plurality of resource objects in the search tree;
   comparing the plurality of unique resource identifiers that provide the respective names for each of the plurality of resource objects in the parsed resource object model to the text-based string in the search query that expresses the unique set of attributes for the requested resource; and
   locating the resource object that represents the requested resource in response to determining that the unique resource identifier that provides the name for the resource object that represents the requested resource expresses the unique set of attributes that the text-based string in the search query expresses.

6. The method of claim 1, wherein the application that requested the resource comprises a command line interpreter.

7. The method of claim 1, wherein the application requests the resource through an application program interface, and wherein the unique resource identifier that provides the name for the resource object that represents the requested resource is returned to the application through the application program interface.

8. The method of claim 1, wherein the resource object model includes an XML document that assimilates the plurality of resource objects and the plurality of unique resource identifiers that provide the respective names for each of the plurality of resource objects within the hierarchical search tree according to the one or more containment relationships among the plurality of resource objects.

9. The method of claim 1, wherein the predetermined query grammar is XPath.

10. The method of claim 1, wherein the plurality of resource objects comprise text-based nodes in the hierarchical search tree.

11. A system for identifying application resources, the system comprising one or more processing devices collectively configured to:
    generate a resource object model that includes a plurality of resource objects organized within a hierarchical search tree according to one or more containment relationships among the plurality of resource objects, wherein each of the plurality of resource objects represents a respective resource having a unique set of attributes, and wherein the hierarchical search tree can be parsed and searched using a predetermined query grammar;
    create a plurality of unique resource identifiers that provide respective names for each of the plurality of resource objects in the resource object model, wherein the respective names that the plurality of unique resource identifiers provide for the plurality of resource objects each include a text-based string that expresses the unique set of attributes for the respectively represented resource within constraints of the predetermined query grammar;

search the hierarchical search tree in response to a request for at least one of the resources represented in the resource object model, wherein the request includes a search query having a text-based string that expresses the unique set of attributes for the requested resource within the constraints of the predetermined query grammar; and return, to an application that requested the resource, the unique resource identifier that provides the name for one of the plurality of resource objects that represents the requested resource, wherein the unique resource identifier includes the text-based string that expresses the unique set of attributes for the requested resource, and wherein the application uses the unique resource identifier returned to the application to interact with the requested resource.

12. The system of claim 11, wherein one or more of the plurality of resource objects in the resource object model represent application resources associated with the application.

13. The system of claim 11, wherein one or more of the plurality of resource objects in the resource object model represent system resources associated with the application.

14. The system of claim 11, wherein each of the plurality of unique resource identifiers are created according to a schema for uniquely naming the resources represented in the resource object model within the constraints of the predetermined query grammar.

15. The system of claim 11, wherein to search the hierarchical search tree, the one or more processing devices are further collectively configured to:

parse the resource object model according to the one or more containment relationships among the plurality of resource objects in the search tree;

compare the plurality of unique resource identifiers that provide the respective names for each of the plurality of resource objects in the parsed resource object model to the text-based string in the search query that expresses the unique set of attributes for the requested resource; and locate the resource object that represents the requested resource in response to determining that the unique resource identifier that provides the name for the resource object that represents the requested resource expresses the unique set of attributes that the text-based string in the search query expresses.

16. The system of claim 11, wherein the application that requested the resource comprises a command line interpreter.

17. The system of claim 11, wherein the application requests the resource through an application program interface, and wherein the unique resource identifier that provides the name for the resource object that represents the requested resource is returned to the application through the application program interface.

18. The system of claim 11, wherein the resource object model includes an XML document that assimilates the plurality of resource objects and the plurality of unique resource identifiers that provide the respective names for each of the plurality of resource objects within the hierarchical search tree according to the one or more containment relationships among the plurality of resource objects.

19. The system of claim 11, wherein the predetermined query, grammar is XPath.

20. The system of claim 11, wherein the plurality of resource objects comprise text-based nodes in the hierarchical search tree.

21. A computer-readable storage medium containing computer-executable instructions for identifying application resources, the computer-executable instructions collectively configured when executed on a processor to:

generate a resource object model that includes a plurality of resource objects organized within a hierarchical search tree according to one or more containment relationships among the plurality of resource objects, wherein each of the plurality of resource objects represents a respective resource having a unique set of attributes, and wherein the hierarchical search tree can be parsed and searched using a predetermined query grammar;

create a plurality of unique resource identifiers that provide respective names for each of the plurality of resource objects in the resource object model, wherein the respective names that the plurality of unique resource identifiers provide for the plurality of resource objects each include a text-based string that expresses the unique set of attributes for the respectively represented resource within constraints of the predetermined query grammar;

search the hierarchical search tree in response to a request for at least one of the resources represented in the resource object model, wherein the request includes a search query having a text-based string that expresses the unique set of attributes for the requested resource within the constraints of the predetermined query grammar; and return, to an application that requested the resource, the unique resource identifier that provides the name for one of the plurality of resource objects that represents the requested resource, wherein the unique resource identifier includes the text-based string that expresses the unique set of attributes for the requested resource, and wherein the application uses the unique resource identifier returned to the application to interact with the requested resource.

22. The computer-readable storage medium of claim 21, wherein one or more of the plurality of resource objects in the resource object model represent application resources associated with the application.

23. The computer-readable storage medium of claim 21, wherein one or more of the plurality of resource objects in the resource object model represent system resources associated with the application.

24. The computer-readable storage medium of claim 21, wherein each of the plurality of unique resource identifiers are created according to a schema for uniquely naming the resources represented in the resource object model within the constraints of the predetermined query grammar.

25. The computer-readable storage medium of claim 21, wherein to search the hierarchical search tree, the computer-executable instructions, are further collectively configured to:

parse the resource object model according to the one or more containment relationships among the plurality of resource objects in the search tree;

compare the plurality of unique resource identifiers that provide the respective names for each of the plurality of resource objects in the parsed resource object model to the text-based string in the search query that expresses the unique set of attributes for the requested resource; and locate the resource object that represents the requested resource in response to determining that the unique resource identifier that provides the name for the resource object that represents the requested resource expresses the unique set of attributes that the text-based string in the search query expresses.

26. The computer-readable storage medium of claim 21, wherein the application that requested the resource comprises a command line interpreter.

27. The computer-readable storage medium of claim 21, wherein the application requests the resource through an application program interface; and wherein the unique resource identifier that provides the name for the resource object that represents the requested resource is returned to the application through the application program interface.

28. The computer-readable storage medium of claim 21, wherein the resource object model includes an XML document that assimilates the plurality of resource objects and the plurality of unique resource identifiers that provide the respective names for each of the plurality of resource objects within the hierarchical search tree according to the one or more containment relationships among the plurality of resource objects.

29. The computer-readable storage medium of claim 21, wherein the predetermined query grammar is XPath.

30. The computer-readable storage medium of claim 21, wherein the plurality of resource objects comprise text-based nodes in the hierarchical search tree.

\* \* \* \* \*